Feb. 4, 1930.    H. D. CHURCH    1,746,213
CLUTCH CONSTRUCTION
Original Filed Oct. 14, 1925

Inventor
Harold D. Church
By Blackmore, Spencer & Flint
Attorneys

Patented Feb. 4, 1930

1,746,213

UNITED STATES PATENT OFFICE

HAROLD D. CHURCH, OF CLEVELAND, OHIO, ASSIGNOR TO GENERAL MOTORS CORPORATION, OF DETROIT, MICHIGAN, A CORPORATION OF DELAWARE

CLUTCH CONSTRUCTION

Original application filed October 14, 1925, Serial No. 62,443. Divided and this application filed February 26, 1927. Serial No. 171,199.

This invention relates to a clutch assembly, particularly intended for use in motor vehicles and is a division of my co-pending application for patent Serial No. 62,443, filed October 14, 1925.

The invention relates to that form of clutch assembly, wherein use is made of a plurality of levers within the assembly, actuated by a sliding collar on the driven shaft to withdraw a spring actuated pressure ring from engagement with clutch discs. It is an object of this invention to improve the structure involved in a connection between the levers and the pressure ring.

Other objects and advantages will be apparent from the following specification and the accompanying drawing of a preferred embodiment of the invention in which.

Figure 1:
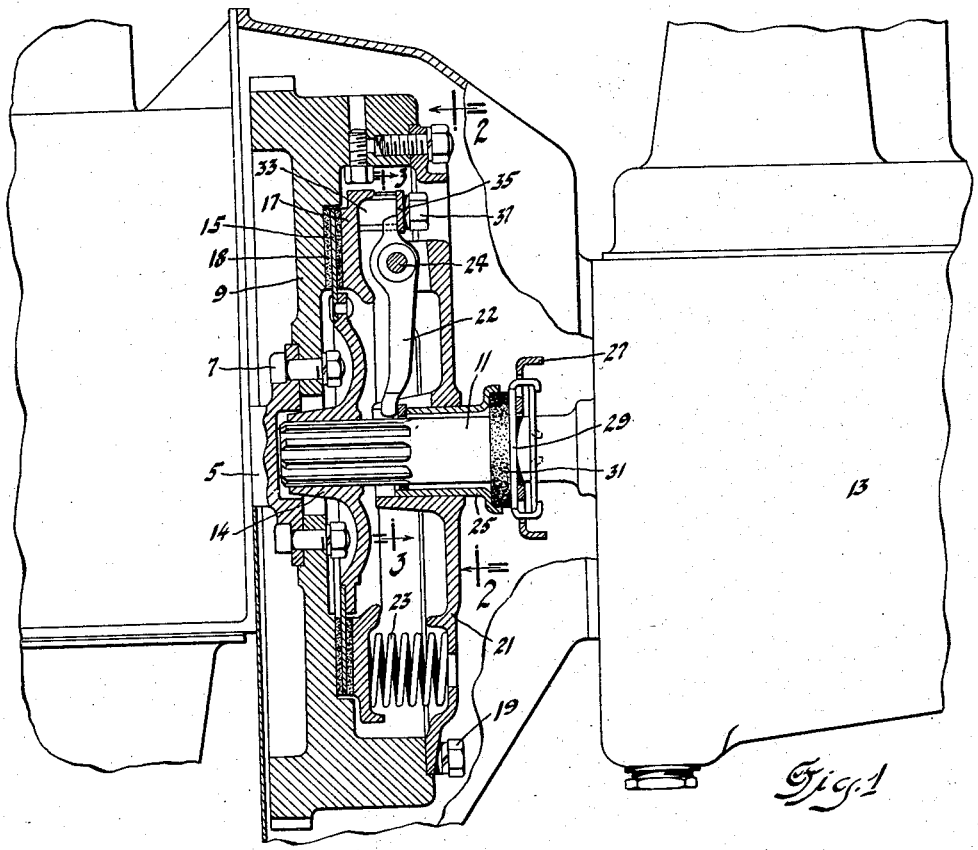
Figure 1 is a view in side elevation, partly in section of the assembly.
Figure 2:
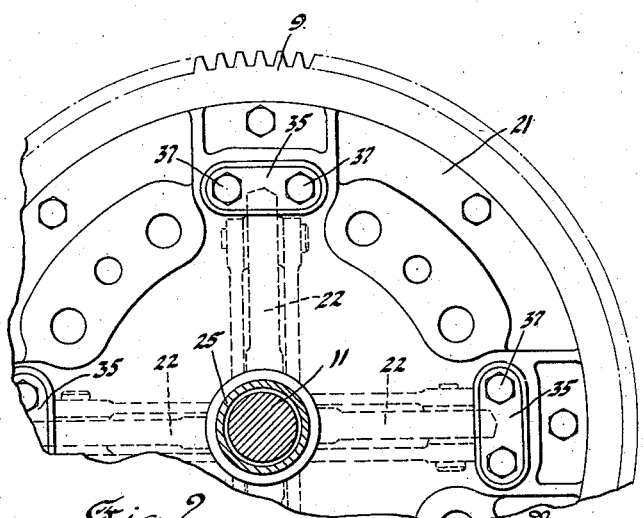
Figure 2 is a rear elevation on line 2—2 of Figure 1.
Figure 3:
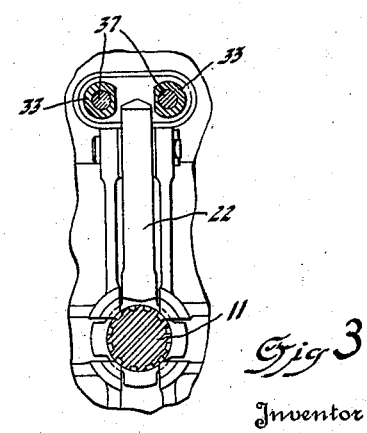
Figure 3 is a section on line 3—3 of Figure 1.

Referring to the drawing, the reference numeral 5 represents the rear end of the crank shaft of the internal combustion engine. This shaft is secured by bolts 7 to fly wheel 9. Axially aligned with crank shaft 5 is driven shaft 11, entering the transmission housing 13. The clutch assembly with which this invention is concerned has for its purpose to provide a releasable connection between the crank shaft and the driven shaft.

Slidably splined to the driven shaft is a member 14, carrying an annular clutch plate 15, preferably of segmental form. A pressure or thrust ring 17 is located to the rear of the clutch plate and friction discs 18 are positioned on either side of the clutch plate between it and the fly wheel and pressure ring respectively.

Bolted as at 19 to the fly wheel is a rear cover plate 21. A plurality of coiled springs 23 bear at one end against the cover plate and at their other ends against the pressure plate to normally hold the clutch elements in driving relation as will be understood.

A plurality of radially extending levers 22, are pivoted to the cover plate as at 24. These levers are engaged at their inner ends by the end of a collar 25 which is slidable on the driven shaft. This collar may be otherwise moved, but is preferably actuated by an operating lever 27, the end only of which is shown on Figure 1. To this lever is secured a ring 29, and between the ring and the collar is shown a thrust member 31 of self-lubricating material such as a solid block composed of graphite embedded in a suitable binder and preferably saturated with lubricant.

The thrust or pressure ring 17 is cast with a number of integral rearwardly projecting bosses 33, arranged in pairs on the back of the ring. The radially extending levers 22 project into the spaces between the bosses of each pair, and bear on plates 35, which bridge the intermediate spaces and are secured to the top faces of the bosses by bolts 37. The bearing plates 35 are preferably of steel or other suitable material, to afford a wear resisting bearing for the outer ends of the levers 22. Any number of actuating levers may be provided as is found desirable, the drawing illustrating the use of four levers spaced ninety degrees apart.

The arrangement with which this specification is particularly concerned, whereby the bosses and steel plates are made use of, has several distinct advantages. If openings corresponding to the spaces bridged by the plates, were to be made in parts of the thrust ring, it would be difficult to correctly position the several integral bearing surfaces, on which the levers are to act, in corresponding relation with the friction face of the ring, and the cost of accurately machining the surfaces in proper relation would be prohibitive. Also in such case, the wearing surfaces would obviously be restricted to the material of the ring, whereas by the use of the apertured bosses and the replaceable plates, steel bearing surfaces are available. Thus wear is easily corrected by merely replacing the bearing plates at an exceedingly small cost, as compared with the necessity of completely dismantling the clutch assembly and substituting and fitting an entirely new pressure ring, which at some future time might be hard to obtain. Furthermore, as compared with the difficulty of manufacture involved in the provision of openings, made in an integral structure the present arrangement is quite simple. By the same machining operation in which other parts of the pressure plate are being surfaced the faces of the bosses are also finished. That is, the friction face of the ring is dressed or finished, either on a line perpendicular to the axis of the ring, or on a line inclined thereto, as the case may be, and the faces of the several bosses are then dressed down or finished, preferably on a line parallel with the friction face, or in some other suitable manner, to present attachment surfaces for the bearing plates, which in regard to each other, bear the same definite relation with the friction face of the ring. Thus, the proper relation between the friction face and the tops of the several bosses, to insure positive and uniform distribution of effort to axially move the pressure member and disengage the clutch, is easy to obtain and is not thereafter subject to variation, due to wear.

Having described the invention, I claim:

1. In a clutch assembly a driving clutch member, a driven clutch member, a member movable under pressure to normally bring the clutch into engagement, a releasing means comprising a pair of integral bosses on the movable part and a replaceable bearing plate secured to the bosses and a lever to bear on the plate between the bosses.

2. In a clutch assembly, a driving member, a driven member, a member movable under pressure to normally bring the clutch into engagement, releasing means including a number of spaced bosses on the movable member, replaceable bearing plates carried by the bosses, each plate being fixed in the same definite relation with the movable member in regard to one another, and a plurality of declutching levers adapted to engage said bearing plates.

3. In a clutch, the combination of a thrust member having a number of integral bosses, cast on the back thereof and arranged in pairs, the top surfaces of the several bosses being spaced equi-distant from the face of the thrust member, detachable bearing plates, secured respectively to the top surfaces of a pair of bosses to bridge the space therebetween, and a plurality of pivoted actuating levers, projecting into the spaces between the bosses of each pair and adapted to act on said bearing plates to disengage the clutch.

4. In a clutch, the combination of a thrust member, having a number of integral bosses arranged in pairs on the back thereof, bearing plates secured respectively to each pair of bosses to bridge the intermediate space therebetween, and operating members adapted to project into such spaces between the bosses of each pair and bear on said plates to disengage the clutch.

5. In a clutch, the combination of a thrust member, having a number of integral spaced projections on the back thereof, replaceable, wear-resisting bearing members secured to said projections to bridge the spaces therebetween, and work performing members extending into said spaces and acting on said bridging members to control the clutch.

6. In a clutch assembly, a thrust ring of cast metal having a series of projections cast integral therewith and arranged in pairs on the rear face thereof, and a wear-resisting plate replaceably mounted on the rear faces of each pair of integral projections and bridging the spaces therebetween to afford a bearing surface for an actuating lever extending between the projections.

In testimony whereof I affix my signature.

HAROLD D. CHURCH.